(12) United States Patent
Klein et al.

(10) Patent No.: US 8,782,477 B2
(45) Date of Patent: Jul. 15, 2014

(54) HIGH-SPEED SERIAL INTERFACE BRIDGE ADAPTER FOR SIGNAL INTEGRITY VERIFICATION

(75) Inventors: Craig Anthony Klein, Austin, TX (US); Aleksander Jaworski, Tampa, FL (US); John Roy Gaudet, Riverview, FL (US); Steven Scott Burroughs, Temple Terrace, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 0 days.

(21) Appl. No.: 13/469,840

(22) Filed: May 11, 2012

(65) Prior Publication Data

US 2012/0290889 A1 Nov. 15, 2012

Related U.S. Application Data (60) Provisional application No. 61/484,864, filed on May 11, 2011.

(51) Int. Cl.
*G11C 29/10* (2006.01)
*G11C 29/54* (2006.01)

(52) U.S. Cl.
USPC .......................................... 714/719; 714/716

(58) Field of Classification Search
None
See application file for complete search history.

(56) References Cited

U.S. PATENT DOCUMENTS

| | | | | |
|---|---|---|---|---|
| 4,782,247 A * | 11/1988 | Yoshida | ......................... | 326/81 |
| 5,717,701 A * | 2/1998 | Angelotti et al. | ............... | 714/30 |
| 6,272,137 B1 * | 8/2001 | Noiri | ......................... | 370/395.1 |
| 6,571,360 B1 * | 5/2003 | Drogichen et al. | ............. | 714/44 |
| 6,628,621 B1 * | 9/2003 | Plankenhorn et al. | ........ | 370/249 |
| 6,971,046 B1 * | 11/2005 | Johnson et al. | .................. | 714/35 |
| 7,516,272 B2 * | 4/2009 | Felton et al. | ................... | 711/112 |
| 7,684,711 B2 * | 3/2010 | Desbruslais et al. | .......... | 398/181 |
| 7,915,923 B1 * | 3/2011 | Yeung et al. | ..................... | 326/82 |
| 2001/0015662 A1 * | 8/2001 | Yamazaki | ..................... | 327/112 |
| 2002/0196908 A1 * | 12/2002 | Hollenbeck et al. | ......... | 379/1.04 |
| 2004/0151038 A1 * | 8/2004 | Ruckerbauer et al. | ........ | 365/200 |
| 2004/0198446 A1 * | 10/2004 | Liu et al. | ....................... | 455/558 |
| 2005/0108490 A1 * | 5/2005 | Vogt | .............................. | 711/167 |
| 2009/0219238 A1 * | 9/2009 | Furuya et al. | ................... | 345/87 |
| 2009/0257745 A1 * | 10/2009 | Petrilla et al. | ................... | 398/30 |
| 2009/0265136 A1 * | 10/2009 | Garcia et al. | .................. | 702/183 |
| 2010/0008409 A1 * | 1/2010 | Cagno et al. | .................. | 375/221 |
| 2011/0320708 A1 * | 12/2011 | Otaka et al. | .................... | 711/114 |
| 2012/0081138 A1 * | 4/2012 | Sul et al. | ..................... | 324/750.3 |

* cited by examiner

*Primary Examiner* — Ajay Bhatia
*Assistant Examiner* — Dipakkumar Gandhi (57) ABSTRACT

A loopback card includes a connector configured to connect to an IO interface and emulate a storage device interface. The connector includes a port configured to receive a set of signals from the IO interface and transmit them to a redriver. The connector is configured to receive the set of signals from the redriver and transmit them from the redriver to the IO interface. The connector includes control signal inputs configured to receive control signals from the IO interface. The connector further includes one or more logic gates configured to receive the control signals. The one or more logic gates apply a logic operation on the control signals to generate an output and route the output to the IO interface through the connector. The redriver is operably connected to the port and configured to receive the set of signals from the port and transmit them back to the port.

15 Claims, 7 Drawing Sheets

HIGH-SPEED SERIAL INTERFACE BRIDGE ADAPTER FOR SIGNAL INTEGRITY VERIFICATION

CROSS REFERENCE TO RELATED APPLICATIONS

The present application claims the benefit of U.S. Provisional Patent Application No. 61/484,864, filed on May 11, 2011.

BACKGROUND

Serial attached SCSI (SAS) storage systems can include numerous hard disk drives (HDDs). For example, a SAS storage bridge bay (SBB) can include 24 HDDs. Testing each HDD and the respective interfaces can require a significant investment in equipment and time. Such requirements are not practical for a manufacturing environment where testing of a single SBB can take hours. Such a testing delay is not practical in manufacturing of SAS storage systems. Testing of other storage systems, such as, just a bunch of drives (JBOD), can also require significant investment in equipment and time.

SUMMARY

In general, one aspect of the subject matter described in this specification can be embodied in methods for testing a storage system. A first set of signals is transmitted via an input/output (IO) interface through a first port of a connector. The connector emulates a storage device interface. From the first port of the connection, the first set of signals is received. And the received first set of signals is verified. Other implementations of this aspect include corresponding systems, apparatuses, and computer-readable media configured to perform the actions of the method.

In general, another aspect of the subject matter described in this specification can be embodied in a loopback card. The loopback cards includes a connector that is configured to connect to a first IO interface and to emulate a storage device interface. The connector includes a first port that is configured to receive a first set of signals from the first IO interface and transmit the first set of signals to a redriver. The connector is further configured to receive the first set of signals from the redriver and transmit the first set of signals from the redriver to the first IO interface. In addition, the connector includes control signal inputs that are configured to receive control signals from the first IO interface. The connector further includes one or more logic gates that are configured to receive the control signals. The one or more logic gates apply a logic operation on the control signals to generate an output and route the output to the first IO interface through the connector. The redriver is operably connected to the first port and is configured to receive the first set of signals from the first port and transmit the first set of signals back to the first port. Other implementations of this aspect include corresponding systems and apparatuses.

In general, one aspect of the subject matter described in this specification can be embodied in a system that includes a first IO interface operably coupled to a plurality of loopback cards. The first IO interface includes a first expander module. The first expander module is configured to send a set of signals to each of the plurality of loopback cards. The first IO interface also includes a first control logic that is configured to send control signals to each of the plurality of loopback cards. Each of the plurality of loopback cards includes a connector operably connected to the first IO interface and configured to emulate a storage device interface. The connector includes a first port that is configured to receive a first set of signals from the first expander module and transmit the first set of signals to a redriver. In addition, the connector is configured to receive the first set of signals from the redriver and transmit the received first set of signals from the redriver to the first IO interface. The connector also includes control signal inputs that are configured to receive control signals from the first control logic. Each of the loopback cards also includes one or more logic gates that are configured to receive the control signals. The one or more logic gates are also configured to apply a logic operation on the control signals to generate an output and route the output to the first IO interface through the connector. The redriver is operably connected to the first port and is configured to receive a first set of signals from the first port and transmit the first set of signals back to the first port. Other implementations of this aspect include corresponding systems.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Figure 1:
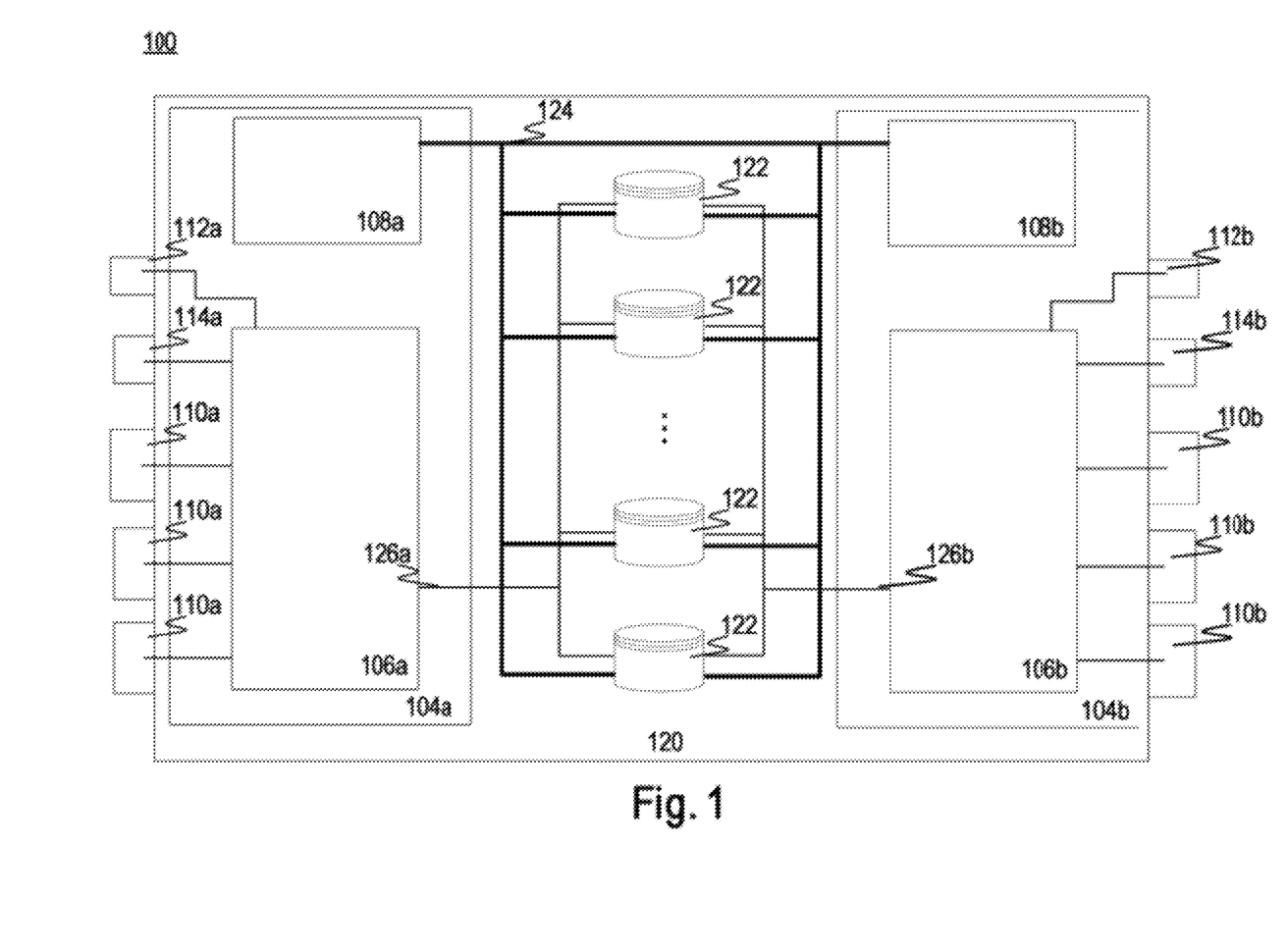
FIG. 1 illustrates a block diagram of a serial attached SCSI (SAS) storage bridge bay (SBB) shelf.

FIG. 1 illustrates a block diagram of a serial attached SCSI (SAS) storage bridge bay (SBB) shelf 100. The SAS SBB shelf 100 includes two SBB input/out (IO) interfaces 104*a* and 104b, a midplane 120, and 24 hard disk drives (HDDs) 122. The number of HDDs can be greater or fewer depending upon the configuration of the SAS SBB shelf 100. Each SBB IO interface 104 comprises a SAS expander module 106 and drive control logic module 108, along with supporting circuitry. The SAS expander modules 106a and 106b can each have three wide 4X SAS external interfaces 110a and 110b which are accessible via mini-SAS (iPASS) style connectors. Each expander also can have 24 narrow SAS interfaces 126a and 126b which can connect to the midplane 120 via high-density connectors (not shown). Each narrow SAS interface 126 can connect through the midplane 120 to one of the SAS HDDs 122.

Figure 2:
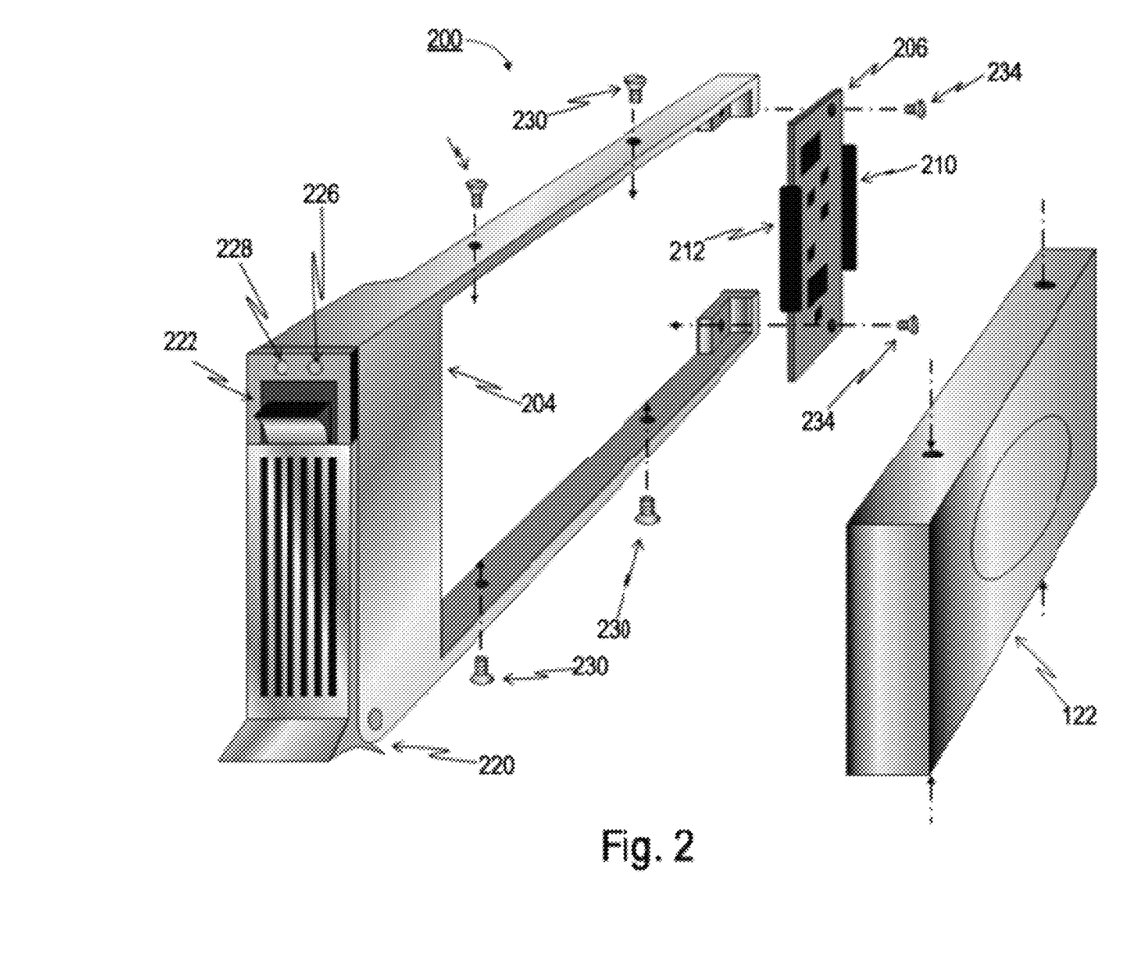
FIG. 2 illustrates a hard disk drive (HDD) carrier assembly.

Each HDD 122 can be dual ported, such that two SBB IO interfaces 104a and 104b may be connected to each HDD 122 for redundancy. The HDDs 122 can be installed within a HDD carrier assembly. FIG. 2 illustrates a hard disk drive (HDD) carrier assembly. Each HDD 122 can be mounted in an HDD carrier 204 using for example, HDD mounting screws 230. A connector (not shown), e.g., a 29-pin SAS connector, can be used to mate each HDD 122 with a corresponding connector 212, e.g., a 29-pin SAS connector, that can be located on an interposer card 206. The interposer card 206 can include logic for power control and external optical signaling via the carrier HDD activity LED 226 and the carrier HDD fault LED 228. The Interposer card 206 can be fastened to the HDD carrier 204 via interposer mounting screws 234. The HDD carriers can be removably-mounted in the SAS SBB shelf 100, and when inserted can connect to the midplane 120 via a 29-pin SAS connector 210 on the interposer card 206. A carrier latch mechanism 320 can lock the carrier assembly 200 into the SAS SBB shelf 100. A carrier latch release 222 can disengage the carrier latch mechanism 220 such that the HDD carrier assembly 200 can be removed from the SAS SBB shelf 100.

Traditionally, high speed storage interfaces have been tested in ways that are time consuming and require specialized equipment. Interfaces can be tested using a high speed oscilloscope connected to the interfaces of a HDD; using a bit error rate tester (BERT); or by monitoring error rates of equipment while in use. Each of these testing methods has drawbacks.

Figure 3A:
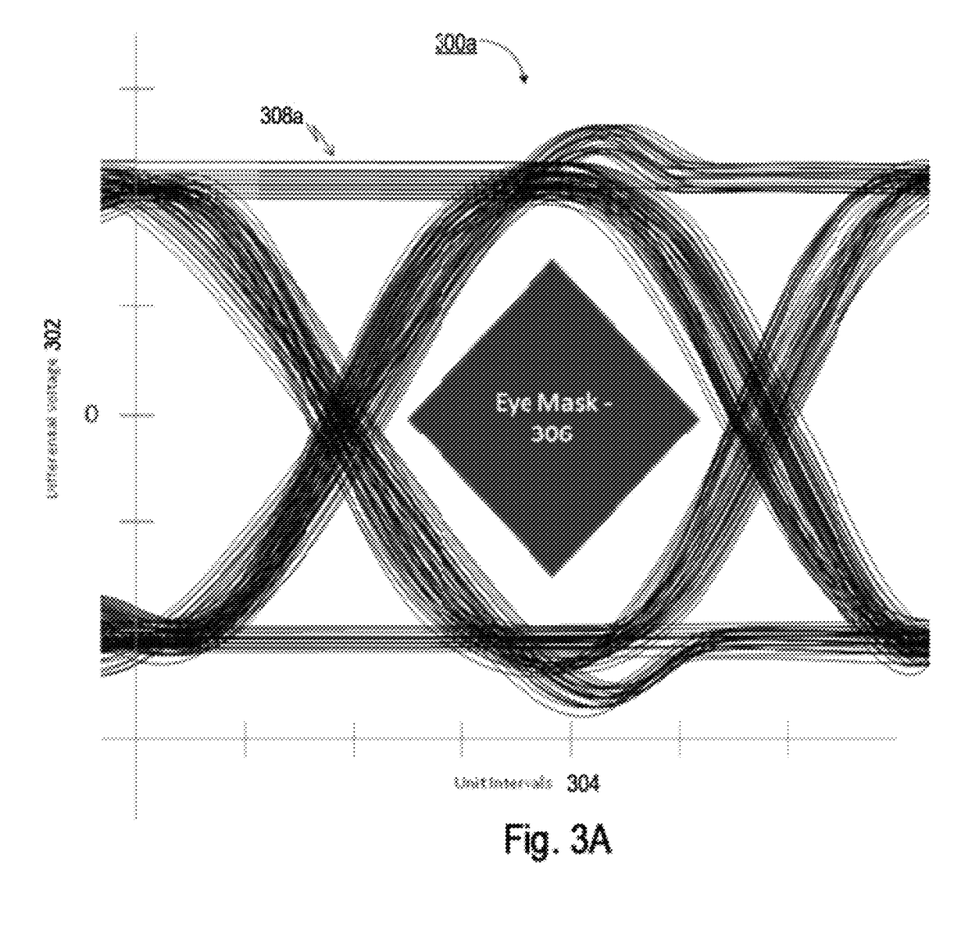
FIG. 3A shows simulated passing signals.
Figure 3B:
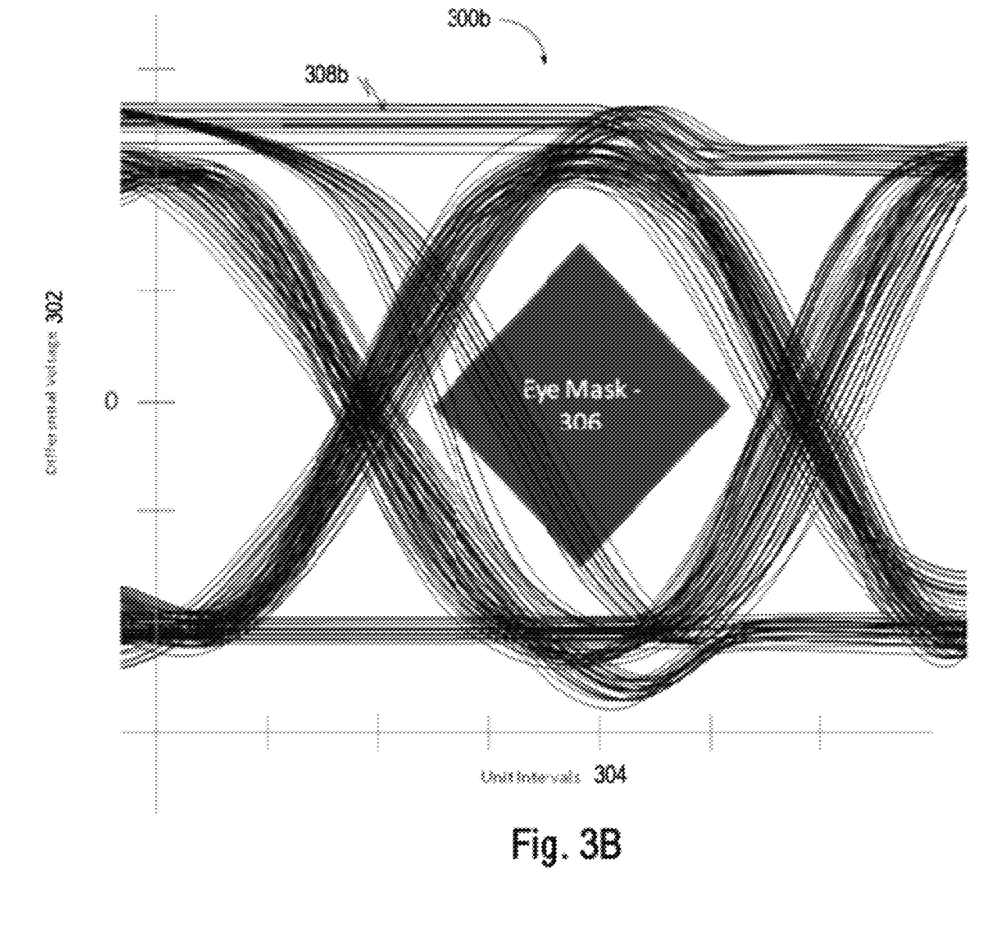
FIG. 3B shows simulated failing signals.

During the development of a product, in the design verification stage of the development cycle, a very high speed oscilloscope with special software (aka signal analyzer) can be used to measure the quality of the signal. The analyzer can employ an eye-mask, which essentially provides a "keep-out" area within receiver signal pattern, such that all bit transitions must take place outside of the mask area. FIG. 3A shows simulated passing signals. The vertical axis 302 shows the differential signal amplitude, and the horizontal axis 304 shows the time in arbitrary units. The analyzer phase-locked loop captures and locks onto the received signal 308a. The analyzer software can then look for any signal samples that impinge upon the eye mask 306a, ensuring that the signal transitions are uniform and of sufficient magnitude, and that signal zero-crossings are at a relatively constant interval; i.e., with minimal jitter. The eye diagram 300a demonstrates what a passing signal should look like. FIG. 3B shows simulated failing signals. Bad eye diagram 300b shows differential signals 308b impinging upon eye mask 306; hence this signal would fail an eye mask test.

Although the analyzer and corresponding software are useful for product development and design verification, it is expensive and not easily understood by someone without an electrical engineering background. Accordingly, this equipment is not conducive to a manufacturing environment. As interfaces can have extremely tight requirements, e.g., 6 Gb/sec, any changes to the impedance of the interface can have a detrimental effect upon the signal; hence, adding a signal analyzer to a SAS connection will affect the very signal being analyzed. Adding the requisite four test-points to each interface in order to provide adequate analyzer access will undoubtedly create non-uniform impedance points, causing signal reflections and decreasing the overall signal quality. Another drawback to this method is the time required to do any meaningful testing. It is not practical, nor economically feasible, to simultaneously instrument all SAS interfaces on a design for concurrent manufacturing testing, so each interface must be tested individually, at both ends of a connection. For a system with 36 SAS ports, this means that an analyzer must be connected to each end of each interface, and eye mask data must be collected with enough samples to ensure signal quality with adequate certainty. The alternative is to infer signal quality through a smaller sample size, but the risk here is that one might miss a system event that occasionally causes an unwanted signal anomaly. Strictly speaking, the smaller the sample size, the less certainty can be placed in the test result.

The SAS 2.0 specification states that a SAS 2 interface shall have a bit error rate (BER) of less than $10^{-12}$. In order to verify that this requirement is met to a 95% confidence level, a test must process $3 \times 10^{12}$ bits of CJTPAT data. At a data rate of 6 Gb/sec, it takes approximately 9 minutes to transfer $3 \times 10^{12}$ bits. In a system with 72 SAS ports, it would take 9 minutes×72 interfaces×2 directions/interface=1296 minutes (over 21 hours!) to verify a single system. In a manufacturing environment, this is very likely not to be practical.

Similarly, a bit error rate tester (BERT) may be utilized to verify signal integrity on an interface. A transmitter is connected to the unit under test (UUT) and test patterns are transmitted through a SAS link with the UUT link in digital loopback mode, such that the bit stream received by the UUT transceiver is deserialized, decoded, buffered, re-encoded, re-serialized, and retransmitted by the UUT transmitter back to the receiver on the BERT. The BERT compares the bit stream received from the UUT to the bit stream that was transmitted, and any discrepancies are counted as bit errors. By counting the number of bit errors per number of bits transmitted, a BER can be measured for a physical layer on the UUT. While effective, this approach suffers from many of the same shortcomings as a signal analyzer when used in a manufacturing environment. One would need 36 BERT units to test a single 36-port UUT in parallel mode, and to test in serial would require too much time.

Another valid method for testing signal quality of high-speed interfaces uses an outwardly "common sense" approach. By using the interface in the means for which it has been designed, signal quality can be inferred from the lack of errors detected by the system. If it works, it must be good. Hence, SAS interfaces are tested by reading and writing data across each interface to the storage devices, verifying that each operation completed successfully. Since all data paths must be tested, this can be a very time consuming process, requiring tight control of expander routing, using multiple zones, etc. For example, test read/write data must contain CJTPAT in the data frames, and SAS data scrambling must be disabled in the system in order to ensure that the patterns are not modified before transmission. Spread-spectrum clocking should be enabled, since this is a form of intentional jitter intended to reduce EMI, and it does contribute to the overall jitter budget.

While this method works, it is also not desirable in a manufacturing environment. Because CJTPAT is only transmitted across an interface in the form of a data frame, each interface must process enough write commands and enough read commands to transfer $3 \times 10^{12}$ bits of CJTPAT data in both directions. If all paths are tested concurrently, each HDD will be receiving read and write commands on both ports, meaning that the sequential read/write performance of the HDD will be compromised, slowing the test. The overall time required to read and write the requisite amount of data to verify the confidence level to a maximum BER therefore depends on the performance bottlenecks inherent in the test system, including the host, host bus adapters, and test software. Depending on system-level read/write commands for BER, testing may require the use of HDDs to act as targets. Link errors are by design normally masked by the SAS protocol, the SAS Host Bus Adapter (HBA), the HBA device driver (DD), and the operating system, so special test programs are needed in order to ensure that any link errors that occur are detected. For example, operating system can compensate for errors during the reading and/or writing of data. In one implementation, link errors can be detected as the operating system, device drivers, protocols, etc., can be bypassed by using a loopback card as described in greater detail below.

The challenges of testing storage systems are not limited to SAS storage systems. Testing any storage system that contains numerous drives, that may or may not redundantly store data, will face the same or similar challenges. For example, testing the IO interfaces a JBOD storage system that includes multiple hard drives would require significant amount of times to test the IO interfaces. For the manufacturers of storage subsystems, one challenge has been to test the signal integrity of the system to a fixed confidence level in a thorough, but cost and time efficient manner.

In light of the challenges in testing SAS storage systems, the SAS 2.0 standard contains recommendations for testing SAS busses, including jitter test patterns, test points, and procedures. Such test patterns can be used in other storage systems, such as a JBOD storage system. This has become even more important with the adaptation of 6 gigabit SAS, as the timing specifications are extremely tight. Some expander manufacturers have begun including special hardware and firmware in their products, allowing the system developer/integrator to write diagnostic routines to test the interfaces. Each SAS port contains a pattern generator and a pattern checker. When the pattern generator is activated, it transmits a predictable pattern out of the SAS port. When the pattern checker is enabled, the port receiver looks for a particular pattern. If any of the bits received do not match the expected pattern, an error is logged. One such pattern is the Pseudo-Random Bit Sequence (PRBS). A PRBS generator can be designed to generate all perturbations of nearterm bit sequences in a seemingly random but predicable order. The second pattern is described in the SAS 2.0 specification, the Jitter Test PATtern (JTPAT), and the variant Compliant Jitter Test PATtern (CJTPAT); which encapsulates the JTPAT within SSP framing characters as data frames. These patterns expose the SAS connections to data patterns that are most likely to create problems with data-dependent jitter. The inclusion of these diagnostic tools into the expander provides an opportunity to leverage them during manufacturing test. Unfortunately, while being excellent design and debug tools, the software provided by the expander manufacturer to access these functions were not designed specifically for manufacturing, and as provided are not directly suitable for a production environment.

To implement a testing strategy that can be used during manufacturing, the target portion of the system hardware within a storage system's data path needs to be considered. HDDs are not ideal test vehicles. They are easily damaged via mishandling, expensive, relatively heavy, and provide no pattern generation or checking capabilities. HDDs can be used as signal redrivers, by placing the SAS port into loopback mode; however, this function is often difficult to implement and the implementation means varies from manufacturer to manufacturer. Varying the receiving and transmission parameters of HDDs is also difficult and often impractical, so multiple HDD models must be used to ensure compatibility with various signal parameters, such as amplitude and pre-emphasis. HDDs also have drive control signals which can be verified manually, but with current testing methods cannot be automatically verified within a manufacturing test.

Figure 4:
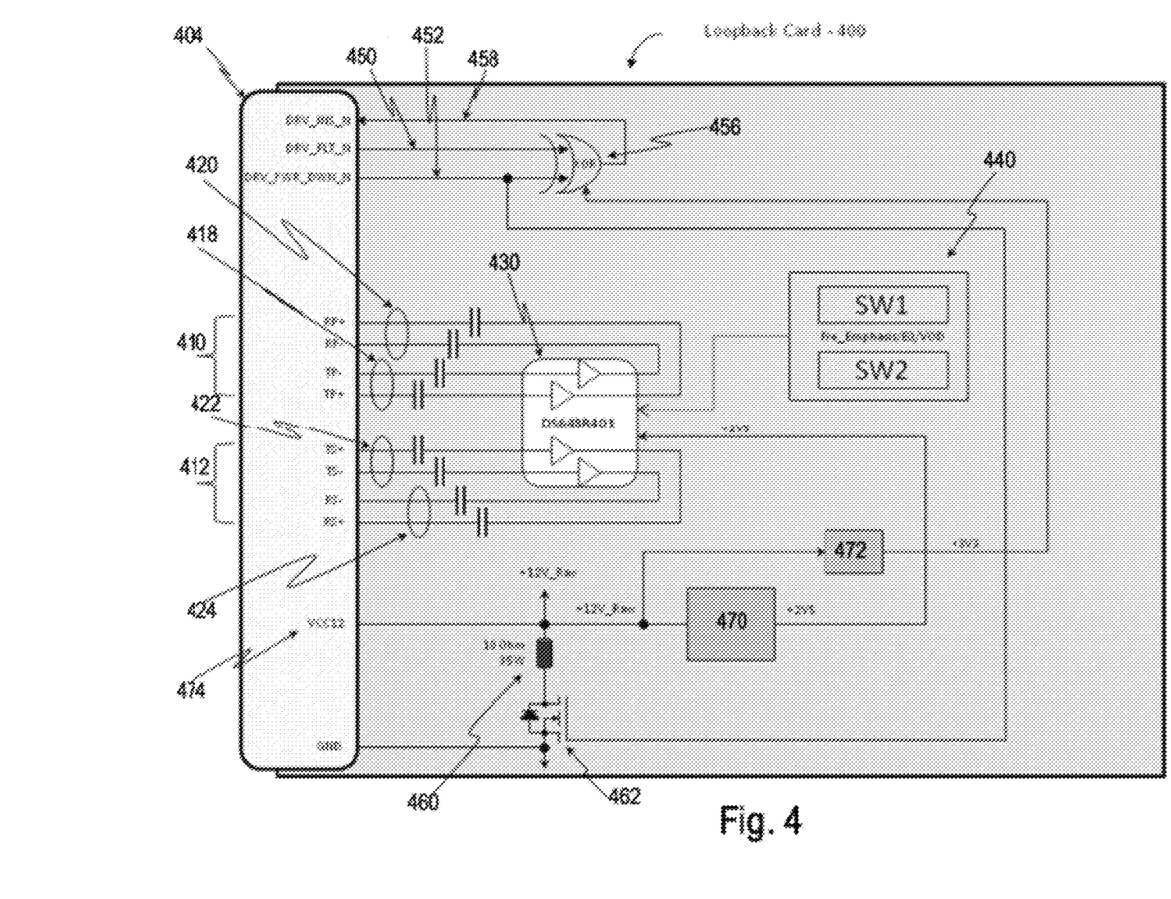
FIG. 4 illustrates a loopback card in accordance with various illustrative implementations.

FIG. 4 illustrates a loopback card 400 in accordance with various illustrative implementations. In one implementation, the loopback card 400 can be configured to simulate a HDD of a SAS storage system. In another implementation, the loopback card 400 can be configured to simulate a HDD of a serial advanced technology attachment (SATA) storage system. The loopback card 400 can be used in place of a HDD during testing of a storage system. As described in greater detail below, the storage system connects to the loopback card 400 in the same way as an eventual HDD will connect to the storage system.

When testing a SAS storage system, the loopback card 400 can mate with the SBB shelf midplane 120 via a standard SAS connector 404, e.g., a 29-pin connector, a 32-pin connector, a 4-pin connector, etc. The connector 404 can include two SAS ports 410 and 412. The SAS port 410 can be a primary port that includes signals TP 418, the signals transmitted by the SAS expander module 106a, and RP 420, the SAS signals transmitted to the SAS expander module 106a. In one implementation, the loopback card 400 operates in a single data path mode where each loopback card 400 has a single SAS port, e.g., the primary port.

In another implementation, the loopback card 400 can operate in a dual data path mode and includes a second SAS port 412. The SAS port 412 can be a secondary port that includes signals TS 422, the SAS signals transmitted by the SAS expander module 106b, and RS 424, the SAS signals transmitted to the SAS expander module 106b. SAS signals 418 and 422 are each routed to a channel of a backplane redriver 430. Redriver 430 is a device that outputs a conditioned signal, such as derived by adjusting and correcting for signal level attenuation and/or noise, with respect to an input signal. The respective re-driven SAS signals 420 and 424 are then routed from the redriver 430, out the same SAS port as each originated, through the 29-pin SAS connector 404, out to the midplane 120, and back to the originating SAS port on the expander modules 106a and 106b. The SAS expander modules 106a and 106b can then check the pattern that it generated to determine any potential errors. Allowing the SAS expander modules 106a and 106b to both send the signals and verify the re-driven signals can greatly simplifying fault isolation at the port level.

Backplane redriver 430 transceivers' parameters can be controlled by two banks of switches 440, allowing the adjustment of the receiving equalization setting, and transmission amplitude, pre-emphasis, and link rate settings. A first bank of switches can be used to adjust the signals TP 412 and the driven signals 420. A second bank of switches can be used to adjust the signals TS 422 and the driven signals 424. Accordingly, the redriver 430 can be used to test different types of storage systems. For example, voltage of the re-driven signals 420 and 424 can vary depending on if the storage system is a SAS storage system or a SATA storage system. Using the banks of switches 440, the re-driven signals 420 and 424 from the redriver 430 can be configured to support various different types of storage systems, e.g., SAS storage systems and SATA storage systems.

Control signals 124 (in FIG. 1) can be sent to the loopback card 400 through the connector 404. The control signals 124 can include a drive fault LED control signal 450 and a drive power control signal 452. In one implementation the drive fault LED signal 450 and the drive power control signal 452 are routed to one or more logic gates 456. For example, the logic gate 456 can be an XOR gate. The resultant drive presence signal 458 can be routed back to the midplane 120 through the connector 404. The drive presence signal 458 can be used to verify the drive fault LED signal 450, the drive power control signal 452, and an inbound drive presence signal without relying on an external connection to the interface. For example, all testing can be performed using a PM8004/5 SXP and its associated GPIO expander. In one implementation, testing information can be provided through an external interface to a remote computing device. For example, an error count indicating the number of times redriven data did not match the data that was originally sent can be provided through the external interface. The two outbound drive control signals 450 and 452 are transitioned individually, and the inbound drive presence signal will toggle with each transition. This eliminates the need for a test operator to observe the state of the drive LEDs 226 and 228 for each drive slot of a system under test.

Power source 474 can be a +12 volt card-level power, and can be provided from midplane 120 through connector 404. Power to SAS redriver 430 can be provided by a +2.5 volt buck regulator 470. LDO 472 can provide +3.3 volt power to the one or more logic gates 456 and other supporting circuit elements (not shown).

Current load resistor 460 simulates the current draw of a typical HDD, and is connected to the power source 474. In one implementation the current load resistor 460 can be a 10 Ohm resistor. Current draw can be enabled and disabled via current load transistor 462 by the drive power control signal 452.

Figure 5:
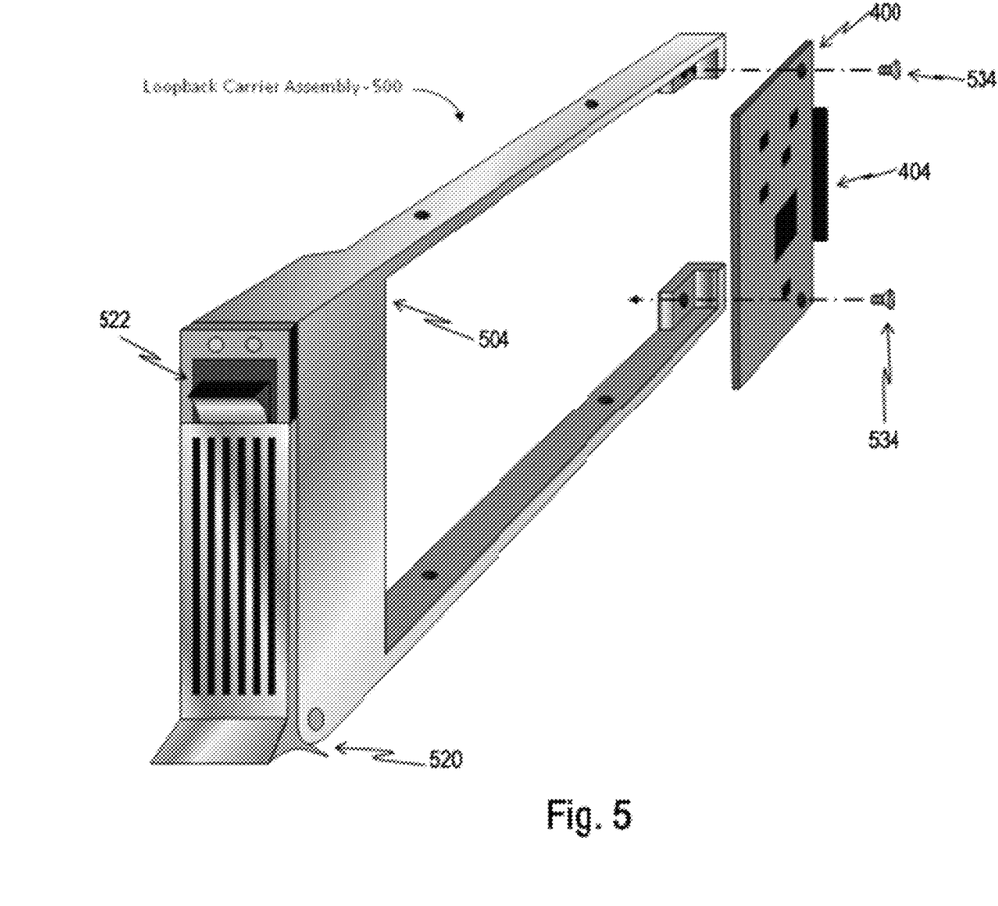
FIG. 5 illustrates a loopback carrier assembly in accordance with various illustrative implementations.

A loopback card can be housed within an assembly. FIG. 5 illustrates a loopback carrier assembly 500 in accordance with various illustrative implementations. The loopback card 400 can mount within a standard HDD carrier 504 in place of the SAS interposer (dongle) card 206. Interposer mounting screws 534 can be used to mount the loopback card 400 within the carrier 504. In one implementation, the loopback carrier assembly 500 can be latched into the SAS SBB shelf 100 via a carrier latch mechanism 520. When testing is completed, the carrier latch release 522 can be used to disengage the carrier latch mechanism 520, and the loopback carrier assembly 500 is removed from the SAS SBB shelf 100.

Figure 6:
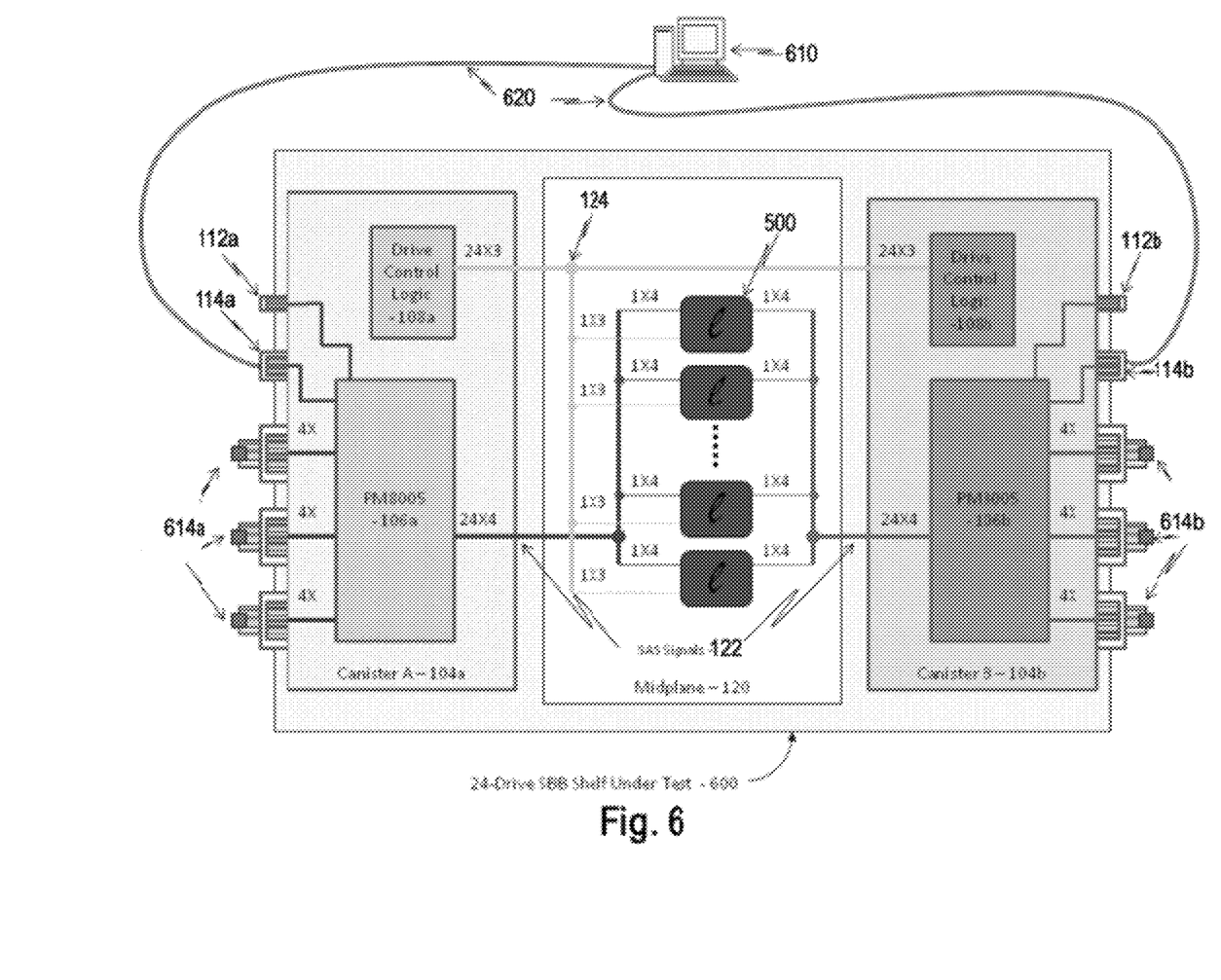
FIG. 6 illustrates a SBB shelf testing system in accordance with various illustrative implementations.

FIG. 6 illustrates a SBB shelf testing system 600 in accordance with various illustrative implementations. The SBB shelf system 600 can be configured for a final system test. Multiple loopback carrier assemblies 500 can be integrated into the SBB shelf system 600. Each loopback carrier assembly 500 can include a loopback card 400. The loopback card 400 can be mounted in the loopback carrier assembly 500 that can be placed into the SAS SBB shelf 100. The loopback card 400 can be used in place of the HDDs 122 (shown in FIG. 1). The external SAS ports can be wrapped back to themselves using standard SAS 4X miniSAS (iPass) wrap plugs 614. Based upon the wrap plugs 614, all SAS interfaces 110 (not shown in FIG. 6) and 122 for both SBB IO interfaces 104a and 104b are now in wrap mode, and all SAS data paths can be tested concurrently via PRBS and CJTPAT pattern generation and checking. In one implementation, this allows 6 GB/s SAS interfaces to be verified according to the recommendations of the SAS-2 specification with nine minutes. Each set of the outbound drive control signals 124 can be manipulated by either drive control logic module 108a or 108b (the signals are dot-ORed at the IO interface), and each inbound drive control signal 124 can be read by either of the drive control logic modules 108a or 108b. Test initiation, control, and monitoring are accomplished via test control PC 610, running a test executive and communicating with the SBB shelf system 600 that is being tested via RS232 cables 620.

Other storage systems can be tested in a similar way using a loopback carrier assembly in place of HDDs of the storage system being tested. Accordingly, storage systems can be tested without requiring HDDs.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and tables in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A loopback card comprising:
a connector configured to connect to a first IO interface and configured to emulate a storage device interface, the connector comprising:
a first port configured to:
receive a first set of signals from the first IO interface;
transmit the first set of signals to a redriver;
receive the first set of signals from the redriver; and
transmit the first set of signals from the redriver to the first IO interface; and
control signal inputs configured to receive control signals from the first IO interface;
one or more logic gates configured to:
receive the control signals;

apply a logic operation on the control signals to generate an output; and
route the output to the first IO interface through the connector; and
the redriver operably connected to the first port and configured to:
receive the first set of signals from the first port; and
transmit the first set of signals back to the first port.

2. The loopback card of claim 1, wherein the redriver is operably coupled to a second port and further configured to:
receive a second set of signals from the second port; and
transmit the second set of signals back through the second port; and
wherein the connector further comprises the second port, and is configured to:
connect to a second IO interface;
receive the second set of signals from the second IO interface; and
transmit the second set of signals to the redriver.

3. The loopback card of claim 1, wherein the first IO interface is configured to compare the transmitted first set of signals with the received first set of signals from the first port.

4. The loopback card of claim 3, wherein the first IO interface is further configured to:
count a number of times that the transmitted first set of signals do not match with the received first set of signals from the first port; and
transmit the count to an external device.

5. The loopback card of claim 1, wherein the control signals comprise one or more of a drive fault LED control signal and a drive power control signal.

6. The loopback card of claim 1, wherein the one or more logic gates comprise an XOR gate, wherein the control signals comprise a drive fault LED control signal and a drive power control signal, and the output from the XOR gate is a drive presence signal.

7. The loopback card of claim 1, further comprising:
a first bank of switches operably connected to the redriver and configured to:
adjust one or more settings associated with the first set of signals received at the redriver; and
adjust one or more settings associated with the first set of signals transmitted from the redriver.

8. The loopback card of claim 7, wherein the one or more settings associated with the first set of signals transmitted from the redriver comprises a voltage used by the redriver to transmit the first set of signals.

9. The loopback card of claim 1, wherein the connector comprises a SAS connector.

10. The loopback card of claim 1, wherein the first IO interface comprises a SAS expander, and wherein the first set of signals is transmitted from the SAS expander.

11. The loopback card of claim 1, further comprising a current load transistor configured to enable power to the one or more logic gates, wherein the current load transistor is enabled by a drive power control signal.

12. The loopback card of claim 1, wherein the redriver is further configured to condition the first set of signals.

13. A system comprising:
a first IO interface operably coupled to a plurality of loopback cards and comprising:
a first expander module configured to:
send a set of signals to each of the plurality of loopback cards; and
a first control logic configured to:
send control signals to each of the plurality of loopback cards;
each of the plurality of loopback cards comprising:
a connector operably connected to the first IO interface and configured to emulate a storage device interface, the connector comprising:
a first port configured to:
receive a first set of signals from the first expander module;
transmit the first set of signals to a redriver;
receive the first set of signals from the redriver; and
transmit the received first set of signals from the redriver to the first IO interface; and
control signal inputs configured to receive control signals from the first control logic;
one or more logic gates configured to:
receive the control signals;
apply a logic operation on the control signals to generate an output; and
route the output to the first IO interface through the connector; and
the redriver operably connected to the first port and configured to:
receive the first set of signals from the first port; and
transmit the first set of signals back to the first port.

14. The system of claim 13, further comprising:
an external computing device, operably connected to the first IO interface through an interface port, configured to:
control the first set of signals sent to the plurality of the loopback cards;
monitor the returned first set of signals from the redriver; and
compare the first set of signals sent to the plurality of the loopback cards with the returned first set of signals from the redriver.

15. The system of claim 13, wherein the first IO interface further comprises:
one or more external interfaces; and
a wrap plug operably connected to each of the one or more external interfaces and configured to connect an output portion of an external interface to an input portion of the external interface, wherein all data paths between the first IO interface and the plurality of loopback cards are used.

* * * * *